United States Patent

Fei et al.

[11] Patent Number: 6,066,904
[45] Date of Patent: *May 23, 2000

[54] LINE-START RELUCTANCE MOTOR WITH GRAIN-ORIENTED ROTOR LAMINATIONS

[75] Inventors: Renyan W. Fei, St. Louis; Jerry D. Lloyd, Florissant, both of Mo.

[73] Assignee: Emerson Electric Co., St. Louis, Mo.

[ * ] Notice: This patent is subject to a terminal disclaimer.

[21] Appl. No.: 09/181,116

[22] Filed: Oct. 28, 1998

Related U.S. Application Data

[63] Continuation of application No. 08/798,757, Feb. 13, 1997, Pat. No. 5,831,367.

[51] Int. Cl.⁷ .................................................. H02K 17/42
[52] U.S. Cl. ........................................ 310/168; 310/217
[58] Field of Search ................................. 310/217, 218, 310/211, 166, 183, 185, 168

[56] References Cited

U.S. PATENT DOCUMENTS

| | | | |
|---|---|---|---|
| 3,210,584 | 10/1965 | Jorgensen et al. | 310/265 |
| 3,662,200 | 5/1972 | Rank et al. | 310/211 |
| 3,671,789 | 6/1972 | Menzies | 310/163 |
| 3,679,924 | 7/1972 | Menzies | 310/163 |
| 3,721,844 | 3/1973 | Fong | 310/166 |
| 3,783,317 | 1/1974 | Sisk | 310/212 |
| 3,899,704 | 8/1975 | Leistner | 310/183 |
| 4,074,160 | 2/1978 | Broadway | 310/184 |
| 4,110,646 | 8/1978 | Rao | 310/163 |
| 4,139,790 | 2/1979 | Steen | 310/156 |
| 4,181,868 | 1/1980 | Grosu | 310/166 |
| 4,293,784 | 10/1981 | Zdaniewski et al. | 310/45 |
| 4,307,443 | 12/1981 | Rettew, Jr. | 363/107 |
| 4,360,752 | 11/1982 | Morgan | 310/82 |
| 4,365,407 | 12/1982 | Zdaniewski et al. | 29/598 |
| 4,459,502 | 7/1984 | El-Antably | 310/184 |
| 4,568,846 | 2/1986 | Kapadia | 310/156 |
| 4,613,842 | 9/1986 | Ichiyama et al. | 336/218 |
| 4,672,252 | 6/1987 | Spirk | 310/216 |
| 4,698,537 | 10/1987 | Byrne et al. | 310/168 |
| 4,845,837 | 7/1989 | Lloyd | 29/598 |
| 4,939,398 | 7/1990 | Lloyd | 310/156 |
| 5,010,267 | 4/1991 | Lipo et al. | 310/162 |
| 5,097,166 | 3/1992 | Mikulic | 310/156 |
| 5,172,020 | 12/1992 | Hibino et al. | 310/26 |
| 5,208,503 | 5/1993 | Hisey | 310/259 |
| 5,296,773 | 3/1994 | El-Antably et al. | 310/261 |
| 5,457,350 | 10/1995 | Sakamaki et al. | 310/216 |
| 5,554,902 | 9/1996 | Kessens et al. | 310/254 |
| 5,818,140 | 10/1998 | Vagati | 310/185 |
| 5,831,367 | 11/1998 | Fie et al. | 310/166 |

*Primary Examiner*—Nestor Ramirez
*Assistant Examiner*—Joseph Waks
*Attorney, Agent, or Firm*—Howell & Haferkamp, LC

[57] ABSTRACT

A rotor for a two-pole synchronous reluctance or a switched reluctance motor can be constructed from a stack of flat, planar laminations of grain-oriented materials. To enhance the necessary anisotropy of reluctance, slots are provided in the lamination along the magnetic flux lines in the preferred grain direction. The laminations may be provided with an essentially circular outer perimeter, and slots for a squirrel cage winding provided. A complete, efficient squirrel cage winding can thus be provided for a two-pole synchronous reluctance motor for starting purposes.

19 Claims, 3 Drawing Sheets

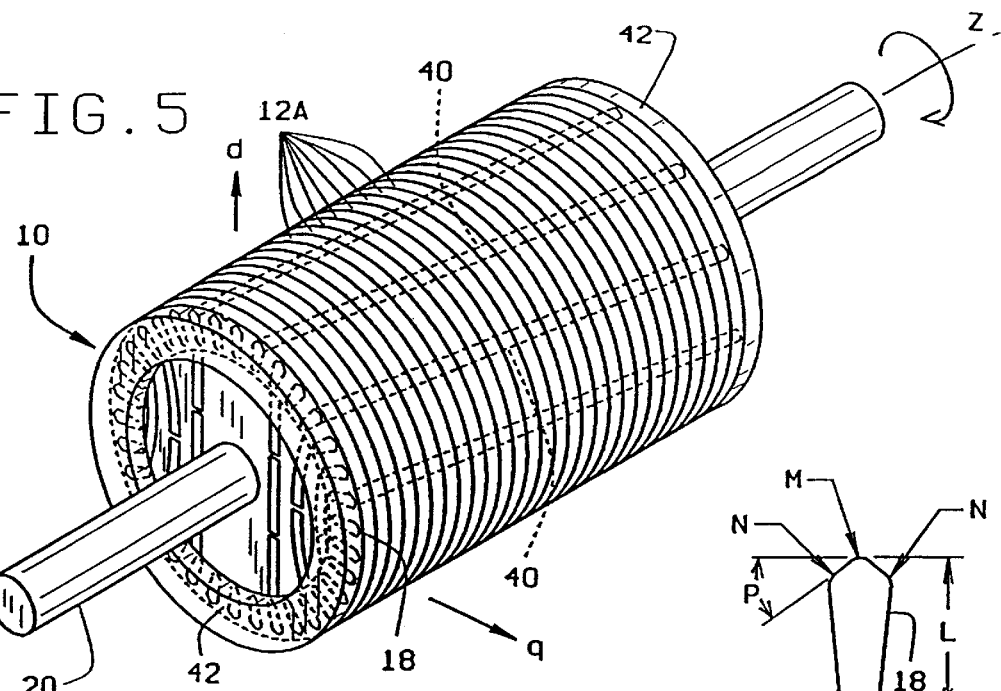
FIG. 5
FIG. 4A
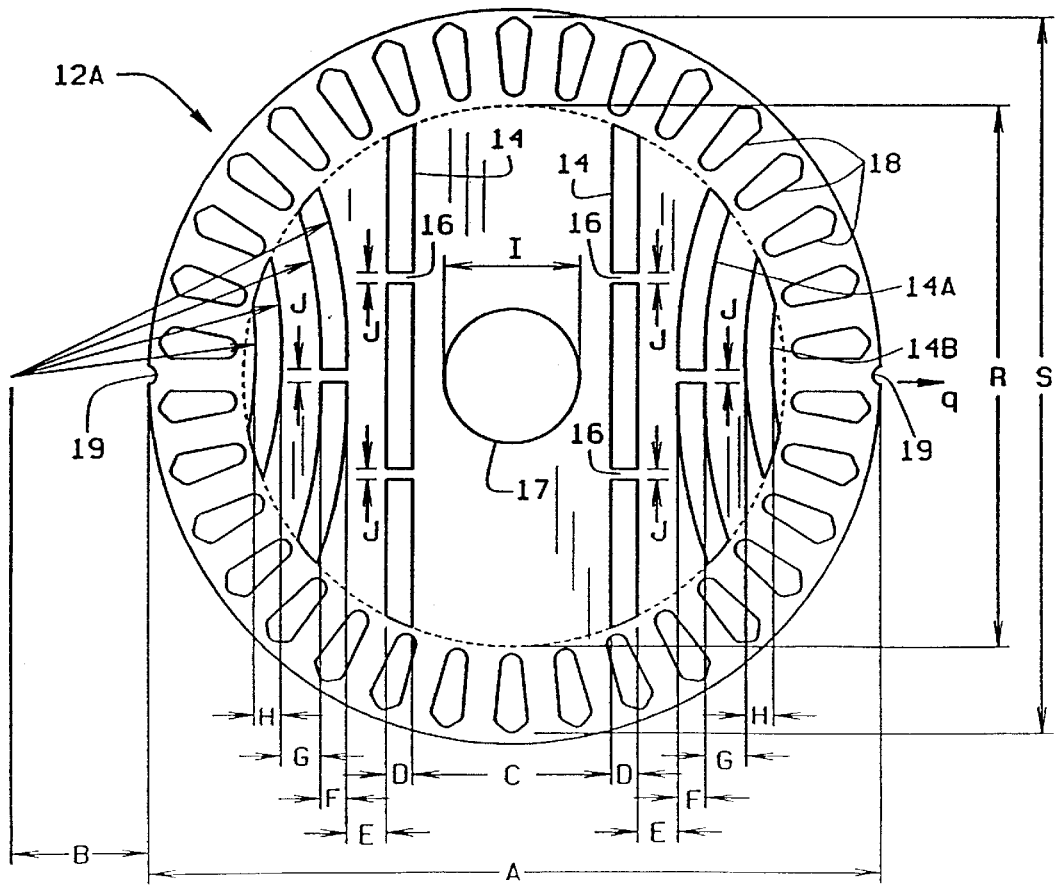
FIG. 4

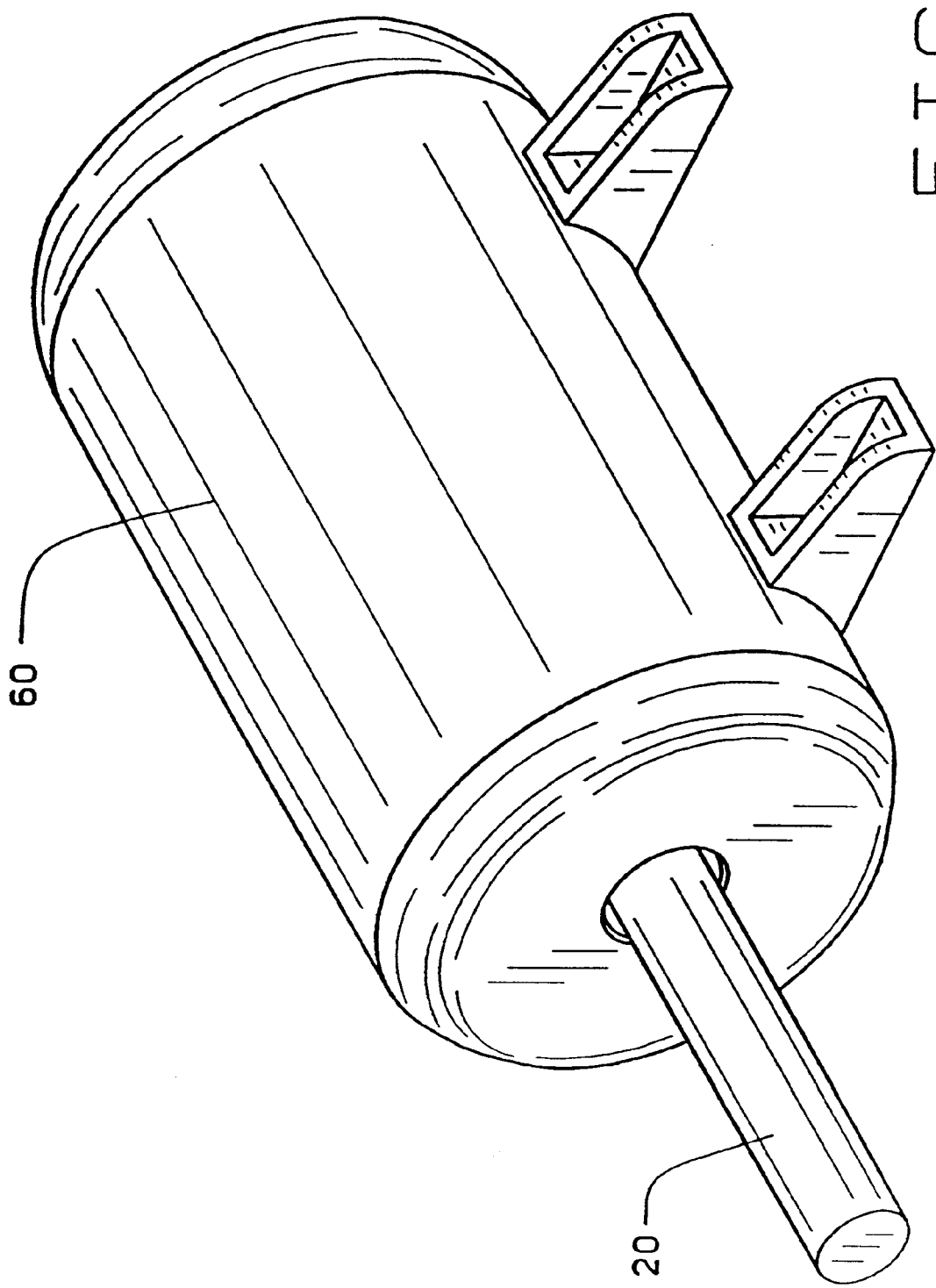

6,066,904

LINE-START RELUCTANCE MOTOR WITH GRAIN-ORIENTED ROTOR LAMINATIONS

This application is a continuation of application No. 08/798,757 filed on Feb. 13, 1997 now U.S. Pat. No. 5,831,367.

BACKGROUND OF THE INVENTION (1) Field of the Invention

This invention relates generally to the field of electric motors, and more particularly to an improved rotor for either a two-pole synchronous reluctance motor or a two-pole switched reluctance motor.

(2) Description of the Prior Art

Prior art synchronous reluctance motors and switched reluctance motors are known. It is also known in the art that the torque developed by an AC synchronous reluctance motor depends upon or is directly related to the ratio of the direct axis reactance to the quadrature axis reactance. The AC synchronous reluctance motor disclosed in U.S. Pat. No. 4,110,646 to Rao, entitled "AC synchronous motor having an axially laminated rotor" provides increased pull-in and pull-out torque by providing a rotor having a plurality of segments wherein each rotor segment is comprised of a plurality of magnetic sub-segments, each comprised of a plurality of laminations of soft magnetic material extending axially parallel to the axis of the shaft and non-magnetic material extending axially parallel to the axis of the shaft and positioned intermediate the laminations of soft magnetic material. The motor disclosed therein has a four pole rotor, but the teachings of Rao are applicable for rotors having any even-numbered pole rotors. Rao discloses that the direct axis reactance can be further increased by using grain-oriented steel as the magnetic material, but that this advantage can only be obtained in a rotor construction having axial laminations rather than radial laminations.

More specifically, as shown in FIG. 1, the prior art rotor 23 comprises a shaft 20 having a core 27 on which are mounted laminations 26 in separate stacks 21 (one for each flux path between the poles) around core 27. The separate axial laminations 26 are held in place by fasteners 22 and plates 24. The shape of the individual laminations 26 is best illustrated in FIG. 2. These sheets are curved so that the high permeability direction (i.e., the d-axis) of the grain oriented material from which the laminations 26 are made is parallel with a section of the rotor taken perpendicularly to the axis of rotation of the shaft 20, and the low permeability direction of the grain oriented material is parallel to the axis of the rotation of the shaft (i.e., the z-axis). Because of the necessary curvature of the laminations and the complicated mounting, motors with this type of lamination, constructed to take advantage of grain-oriented material, may be expensive or impractical to build for some applications. Moreover, axially laminated motors have required additional electronics to start, and a starting cage is difficult to provide for axially laminated motors.

Patents to El-Antably, specifically U.S. Pat. No. 4,459,502, entitled "Self-cascaded reluctance motor with axially laminated rotor," and U.S. Pat. No. 5,296,773, entitled "Composite rotor for a synchronous reluctance motor," also describe rotors in which grain-oriented material may be used. Both of the El-Antably patents also disclose axial rather than radial laminations, however.

U.S. Pat. No. 3,679,924 of Menzies describes a "radially stacked group of closely-nested thin flat sheets or strips . . . the sheets being preferably a grain-oriented steel having high unidirectional permeability." However, as shown, for example, in FIG. 3 of Menzies, the stacks comprise radially stacked, axial laminations rather than axially stacked, radial laminations. Thus, each of the pair 3 of stacks on opposite sides of the rotor in FIG. 3 of Menzies requires a retaining bar extending parallel with the rotor axis to hold the stack in a compressed condition with the aid of fastening bolts. Because of the complicated mounting and the fact that individual laminations are of varying sizes, a motor made with a rotor as described in Menzies may, in some applications, be too expensive or impractical to manufacture.

The inventions disclosed in each of the aforementioned patents are all, to at least some degree, relatively difficult, expensive, and/or impractical to manufacture, compared to the easier, less expensive, and very practical methods of punching and stacking conventional radial laminations. Commercial punching dies exist that can easily and quickly manufacture such rotors.

It would therefore be desirable to provide a laminated core for a synchronous reluctance or switched reluctance motor that provides increased pull-in and pull-out torque by employing grain-oriented magnetic material, but which can be conveniently manufactured with radial laminations.

It is also known that the anisotropy of grain-oriented magnetic material is reduced when the material is subjected to low flux densities.

It would therefore be advantageous to provide a grain-oriented laminated rotor for a synchronous reluctance motor, wherein the rotor additionally accommodates a full squirrel-cage winding on the rotor to allow it to be line-started.

BRIEF DESCRIPTION OF THE INVENTION

There is therefore provided, as one aspect of the invention, a motor of a type selected from the group consisting of synchronous reluctance and switched reluctance motors, with an improved rotor comprising a plurality of substantially planar radial laminations, the laminations being stacked axially and being made of grain-oriented magnetic material. The grain-oriented material should preferably have an inherent longitudinal to transverse permeability ratio of about 10, or more preferably above 100 (at least at higher operating flux levels), and each of the stacked radial laminations should have d- and q-directions defined by (and for the purpose of this description, may be considered to be synonymous with) the longitudinal and transverse directions, respectively, that are mutually perpendicular and that are both perpendicular to the axis of rotation. It should be understood that the terminology "inherent permeability ratio" refers to the ratio of permeability inherent in the grain-oriented magnetic material alone, without slots punched in the materiail. The high permeability ratio of the grain-oriented steel and the flux-directing slots punched in the grain-oriented material both contribute to the motor's high torque and efficiency. (The longitudinal direction of the grain of the grain-oriented magnetic material is, of course, the high-permeability direction of the material.)

There is also provided, as another aspect of the invention, a motor with a rotor comprising axially stacked radial laminations mounted on a shaft, wherein the laminations are essentially circular in shape and are comprised of a grain-oriented material having parallel grain orientations, and also have an inherent permeability ratio of at least 100 at an operating level of magnetic flux, and further wherein a longitudinal and a transverse direction of the grain of the lamination and an axis of rotation of the shaft are mutually perpendicular.

Motors in accordance with the invention also can be provided with a starting winding, and more particularly, a squirrel cage winding to permit a motor employing such a rotor to be line-started, if such an auxiliary starting means is necessary or desirable. Manufacturability of the motor may also be improved in that all of the laminations may be of equal or essentially equal size and shape.

Laminations in rotors in accordance with this invention may have elongate slots oriented in a direction essentially parallel to the d-direction, or even more preferably, oriented along actual flux lines in the magnetic material generally along the d-direction, so that the permeability in the q-direction is substantially reduced without substantially reducing the permeability in the d-direction. Slots that are oriented along actual flux lines in the magnetic material (generally along the d-direction, even though somewhat curved, shall, for the sake of convenience, be denoted as being "generally parallel" to the d-direction. (Typically, such slots would generally follow a direction of highest permeability of the magnetic material, but may be concave in an outward direction from the center of the lamination.) The term "at least generally parallel" shall be understood to encompass both somewhat curved slots generally parallel to the d-direction as well as slots essentially parallel to the d-direction.

It is therefore an object of this invention to provide a conveniently and inexpensively manufactured rotor having a laminated core for use in synchronous reluctance motors and switched reluctance motors.

It is another object of the invention to provide a rotor in a synchronous reluctance motor that provides increased pull-in and pull-out torque by employing grain-oriented magnetic material, but which can be more conveniently manufactured with radial laminations.

It is yet another object of the invention to provide a grain-oriented laminated rotor in a synchronous reluctance motor, wherein the rotor additionally accommodates and includes a full squirrel-cage winding on the rotor to allow the motor to be line-started.

These and other objects of this invention will become evident to one skilled in the art upon reviewing the detailed description of the invention and the accompanying drawings.

BRIEF DESCRIPTION OF THE DRAWINGS

FIGS. 4 and 4A are drawings of another lamination embodiment in accordance with the invention, wherein FIG. 4 is a drawing of the entire lamination, and FIG. 4A is a detail drawing of a conductor slot;

FIG. 5 is a perspective drawing of a rotor in accordance with the invention employing a stack of laminations of the type of FIG. 4; and FIG. 6 is a perspective view of a synchronous reluctance or switched reluctance motor having an improved rotor in accordance with the teachings herein.

The reader should not assume that the Figures are necessarily drawn to scale.

DETAILED DESCRIPTION OF THE INVENTION

As used herein, the term "switched reluctance machine" is used to refer to an electromechanical energy converter having a torque due to the timing of unipolar or bipolar stator excitation current pulses in a doubly salient variable reluctance structure. The term "synchronous reluctance machine" is used to refer to an electromechanical energy converter having a torque that is due to synchronization of a stator rotating field and a rotor having a high d- and q- axis permeability ratio.

Figure 1:
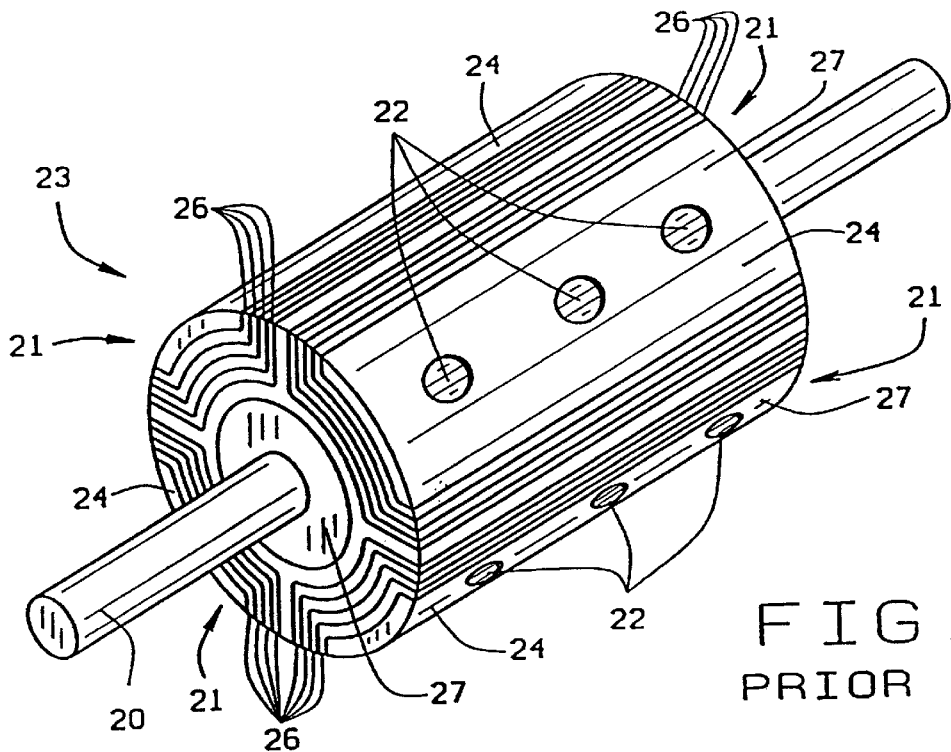
FIG. 1 is a perspective drawing of a prior art, four-pole rotor with grain oriented steel laminations.
Figure 2:
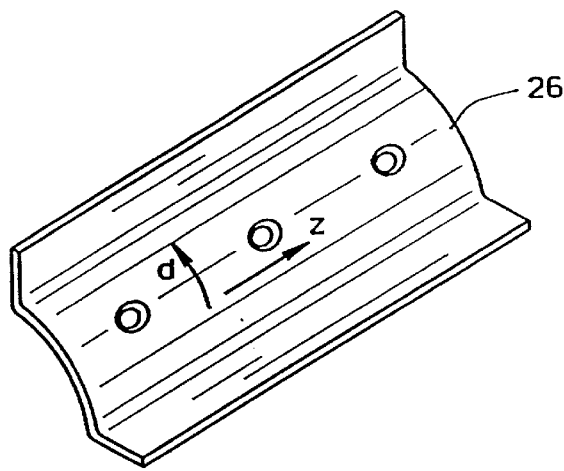
FIG. 2 is a perspective drawing of a single prior art grain-oriented lamination used in the device of FIG. 1.

To avoid confusion, it is noted that the term "radially stacked, axial laminations," (also called simply "axial laminations") as used herein, refers to laminations stacked over one another on a rotor so that the stacking direction is outward from the axis of rotation of the rotor shaft. (Individual axial laminations would usually, but not necessarily, be elongate in a direction parallel to the axis of rotation of the shaft.) On the other hand, the term "axially stacked, radial laminations," (also called simply "radial laminations") as used herein, refers to laminations stacked one over another in which the stacking direction is in the same direction as the axis of rotation of the motor, or in a parallel direction thereto, such that the individual laminations extend primarily radially from the axis of the rotor shaft. Thus, the laminations 26 shown in prior art FIGS. 1 and 2 are axial laminations, because they are stacked over one another in a direction outward from the axis of rotation of the shaft 20. The laminations shown in FIG. 5 are radial laminations, because they are stacked along the direction of the axis of rotation of shaft 20. The laminations of the present invention comprise axially stacked, radial laminations.

Figure 3:
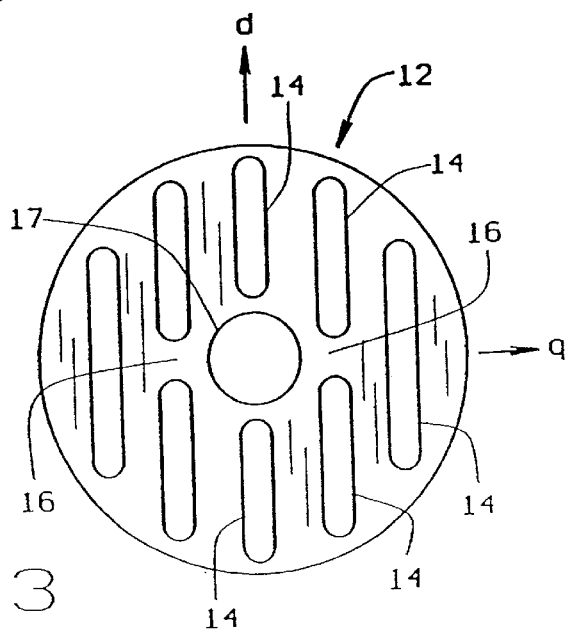
FIG. 3 is a drawing of a lamination embodiment in accordance with the invention.

In a synchronous reluctance machine, electromechanical energy conversion is due to a variation of reluctance with motor position. To produce a reluctance torque, grain-oriented steel is used for the laminations in accordance with the invention to produce an asymmetric reluctance and thereby provide a pair of salient poles in planar, punchable radial laminations, which can be stacked on a shaft with the preferred reluctance direction of each lamination aligned in parallel with one another. Rotor laminations in accordance with the invention are preferably also provided with slots that enhance the inherent asymmetric reluctance of the grain-oriented material, to thereby increase the effective asymmetry. Referring to FIG. 3, a lamination 12 for a rotor in accordance with this aspect of the invention has elongate slots 14 longitudinally aligned with a flux direction to provide the lamination with "flux guides" that thereby provide a much lower reluctance to an externally applied magnetic field along a d-axis than along a perpendicular q-axis in the plane of the lamination. It will readily be appreciated by those skilled in the art that an applied flux along an axis parallel to the axis of rotation and perpendicular to the elongate direction of the slots 14 encounters a much higher reluctance because of the much higher reluctance of air as compared to the ferromagnetic material from which rotor lamination 12 is punched. Slots 14 may form segments of chords across a stack of laminations 12, preferably with narrow bridges 16 separating the segments to provide mechanical strength to lamination 12. It is thus readily observed that slots 14, even in a lamination with an essentially circular outer perimeter as shown in FIG. 3, can provide lamination 12 with a pair of salient poles defining a d-axis direction, and a perpendicular q-axis direction of higher reluctance.

The objective of the design of lamination 12 is to maximize the ratio of the reluctance in the d-direction to that in the q-direction, while maintaining sufficient physical strength. For identical stator and rotor geometries, pull-out torque can be increased by a factor of about 1.3, and preferably more, by using anisotropic, i.e., grain oriented, material for the laminations by aligning the grain (i.e., high permeability direction) along the d-axis defined by slots 14 in accordance with the present invention. The resulting effective lateral to transverse permeability ratio and resulting motor efficiency is attributable to the anisotropy produced by the geometry alone and that inherent in the magnetic material, if the corresponding axes for both types of anisotropies are aligned.

The design principles involved in selecting a geometry for the internal slots 14 are to provide (nearly) rectangular slot shapes having their longer sides parallel with a flux path close to the magnetic material grain-oriented direction, i.e., the steel rolling direction, if steel is the magnetic material. Such slots impede the d-axis flux only slightly, while greatly impeding the q-axis flux. urther in accordance with these design principles, a larger number of slots in parallel is preferable, to maximize the inductance ratio. Because of saturation, the flux density in the d-flux direction cannot be too great, so it is also preferred to use thinner slots which thereby produce better motor performance, up to the limit of manufacturing feasibility. To minimize the q-axis flux, bridges in the q-flux direction should be as narrow as possible, up to the limit of manufacturing feasibility. However, as a further advantage of using grain-oriented material for the lamination, the relatively low permeability of the grain-oriented material in the q-direction (as compared to the d-direction) allows these bridges to be wider than would otherwise be the case with normal magnetic material.

The grain-oriented laminations of FIG. 3, which are suitable for two-pole motors, should be contrasted with those shown in FIGS. 1 and 2, which are axially rather than radially laminated, and which are neither flat, planar, stackable in a radial orientation, nor punchable with common lamination presses. Note that, while the low permeability (z-direction) of the laminations in FIGS. 1 and 2 are parallel to the axis of shaft 20, the low permeability (q-direction) of lamination 12 in FIG. 3 (and in other laminations in accordance with this invention) is perpendicular to the axis of the shaft (not shown in FIG. 3).

Another design of a lamination suitable for a rotor in accordance with the invention is illustrated in FIG. 4. The design of FIG. 4 helps to further increase the reluctance torque. Lamination 12A is provided with a plurality of slots 14, 14A, and 14B on both sides of center hole 17. Center hole 17 is provided for a shaft upon which laminations 12 are mounted and stacked, but which is not shown in FIG. 4. Slots 14, 14A, and 14B provide flux guides to produce a much lower reluctance to an externally applied magnetic field along the d-axis than along the q-axis. However, slots 14A and 14B are variations of slots 14 that, by being curved concave outward (i.e., outward from center hole 17), better approximate the path of flux lines through the lamination for a two-pole motor, as would be recognized by one skilled in the art. Narrow bridges 16 may be provided to enhance the physical strength of the lamination. Also provided are rotor bar slots 18 for a squirrel cage winding (not shown in FIG. 4), which may be used to provide a starting torque to the motor. Laminations 12A are punched from grain-oriented material with the grain-orientation in the d-direction, similar to the orientation of laminations 12 in FIG. 3.

One or more skew notches 19 may be provided for skew measurement. Their presence and location are both optional, but their locations may be selected to be on the q-axis to increase the q-axis reluctance, if desired.

It is known in the art that synchronous reluctance motors do not, by themselves, provide a starting torque. Thus, a starting winding is usually provided to create a starting torque. One aspect of the present invention improves upon starting windings, for two-pole synchronous reluctance motors, by providing asymmetric reluctance properties in rotor laminations having a circular (or nearly circular) outer perimeter. This shape allows a full squirrel cage winding to be provided on the rotor, thereby increasing the effectiveness of the squirrel cage in starting the motor.

FIG. 5 shows an arrangement of the laminations 12A to form a rotor 10 in accordance with the invention. Laminations 12A are radially laminated on the shaft 20, in contrast to the axial laminations of FIGS. 1 and 2. The combination of slots 14, 14A, and 14B, together with the grain orientation in the d-direction, provide sufficient asymmetry in reluctance to allow the rotor to be useful in either a two-pole synchronous reluctance motor or switched reluctance motor. The rotor 10 is comprised of a plurality of stacked radial laminations 12, each of which is comprised of gxain-oriented steel. Laminations 12 are mounted on a shaft 20 that defines an axis of rotation Z. The laminations themselves are punchable, manufacturable laminations of grain-oriented steel with parallel grain orientations, and the grain oriented material has an inherent permeability ratio of at least 100 and preferably higher. It will be observed, also, that each of the stacked radial laminations have d- and q- directions that are both perpendicular to the axis of rotation Z. Conductor bars 40 of a squirrel cage, which would not normally be visible from the outside of the motor, are illustrated with hidden lines. (For clarity of illustration, only a few conductor bars 40 are indicated in the drawing, but it will be understood that there would be a conductor bar passing through each of the laminations' conductor bar slots 18.) Bars 40 may be cast from aluminum, by methods known to those skilled in the art. Squirrel cage rings 42 on (either side of the stack of laminations 12A would also form part of the casting, and thus would be integral with the conductor bars 40. Squirrel cage rings 42 may also be provided with fins (not shown) to provide air circulation for cooling the motor, as known in the art.

ARMCO-Oriented and TRAN-COR H electrical steels have 30 times more permeability in the d-direction than in the q-direction for an applied flux density of 1.5 Tesla. However, the anisotropy of reluctance caused by the grain orientation typically varies as a function of the applied flux density. After heat treatment (stress relief) of laminations made of grain-oriented steel in accordance with the invention, the permeability in the d-direction was found to increase 3.5 times, whereas the permeability in the q-direction was essentially unchanged. This increase resulted in an increase in the permeability ratio from about 30 to about 100 for one batch of motors. The higher permeability ratio is beneficial in that it increases the reluctance torque and reduces stator current and motor losses. In particular, the permeability ratio of longitudinal to transverse directions of ARMCO M6 steel after stress relief has been measured, and is presented in Table I as a function of applied flux density in Teslas.

TABLE I

| Flux Density in Teslas | Longitudinal to Transverse Permeability Ratio |
| --- | --- |
| 0.310 | 15.4 |
| 0.465 | 12.4 |
| 0.620 | 10.7 |
| 0.775 | 9.60 |

TABLE I-continued

| Flux Density in Teslas | Longitudinal to Transverse Permeability Ratio |
|---|---|
| 0.93 | 8.80 |
| 1.085 | 8.40 |
| 1.24 | 9.00 |
| 1.395 | 40.5 |
| 1.55 | 114.0 |
| 1.70 | 96.0 |
| 1.86 | 21.5 |

During starting of a synchronous reluctance motor including a rotor 10 comprising a stack of radial laminations 12 or 12A in accordance with the invention and having variable anisotropy varying with applied magnetic field, the starting and synchronous reluctance torques vary.

Thus, for a two-pole PSC motor (such as a dishwasher motor), no changes would be required, except that the rotor would use the geometry of FIG. 4 and employ grain-oriented transformer steel. (Of course, by making these changes, the motor would become a synchronous reluctance motor rather than a PSC motor.) Two capacitors would be used, one for starting, and another for running An over-voltage could be used for synchronizing the motor, and a normal voltage would be used for running the motor.

Although the invention lends itself to motors of various sizes, a particular example with dimensions is provided for a lamination 12B of FIG. 4 and FIG. 4A in accordance with the invention without the intention that the invention be limited thereto. (It should not be inferred that FIG. 4 and FIG. 4A are drawn to scale.) A list of dimensions for a lamination using grain-oriented material in accordance with the invention is given in Table II. This lamination is 0.014" thick.

TABLE II

| Dimension | Size in Inches (unless otherwise noted) |
|---|---|
| A | 2.84 (diameter) |
| B | 1.42 (radius) |
| C | 0.75 |
| D | 0.10 |
| E | 0.15 |
| F | 0.10 |
| G | 0.15 |
| H | 0.10 |
| I | 0.499 (diameter) |
| J | 0.035 |
| K | 0.060 |
| L | 0.314 |
| M | 0.030 (radius) |
| N | 0.020 (radius) |
| P | 45 degrees |
| R | 2.10 (diameter) |
| S | 2.80 (diameter) |

Using rotor laminations having the dimensions in Table II, two different motors were built with the same geometry and same stator configuration, but with 35 non-grain-oriented steel (low carbon cold-rolled motor lamination steel) 0.031" thick for rotor laminations in one motor, and 78 grain-oriented steel (Armco M6) 0.014" thick for the rotor laminations of the other motor. Both motors were run off a single-phase power supply at 120 volts, with a run capacitor of 25μF. It was found that, at a synchronous speed of 3600 rpm, the maximum torque of the motor using grain-oriented steel was 12 oz-ft, whereas the maximum torque of the motor using the non-grain-oriented steel was only 9 oz-ft.

A dynamoelectric device 30, such as a motor, utilizing the improved rotor 10 of the present invention is depicted in FIG. 6.

It has been found advantageous to provide a stator winding that provides, at rated load, a nearly round rotating field. In conjunction with laminations and stators constructed in accordance with this invention, a more nearly round rotating field reduces rotor losses caused by backward rotating fields.

One skilled in the art would recognize that the principles discussed above can be applied to generators as well as to motors. Thus, the present invention is to an improved dynamoelectric device.

Thus, it will be seen that the invention provides a practical alternative to axially laminated motors, by allowing the use of manufacturable punched laminations, by combining geometry with grain oriented magnetic material to obtain a high longitudinal to transverse permeability ratio, and by allowing the use of a full induction cage with end rings for starting.

Although the invention has been discussed in conjunction with specific embodiment thereof, it will be understood by those skilled in the art that many variations are possible within the spirit of the invention. For this reason, the invention is not to be considered as limited to the specific embodiments discussed above, but only by the scope of the claims appended below, including the entire range of applicable equivalents thereto.

What is claimed is:

1. In a dynamoelectric device of a type selected from the group consisting of synchronous reluctance and switched reluctance machines, the improvement comprising:

a rotor having a center axis, said rotor formed by a plurality of radial laminations, said laminations being stacked axially and being made of grain oriented magnetic material having a direction of highest magnetic permeability, said direction of highest magnetic permeability of said magnetic material being parallel to a plane that bisects each of said laminations, each of said laminations having at least one pair of internal slots, said at least one pair of internal slots being aligned in a direction at least generally parallel to said plane, and said at least one pair of internal slots being symmetric about said plane.

2. The device of claim 1 wherein said plurality of laminations are substantially planar.

3. The device of claim 2 wherein said rotor further comprises a starter winding.

4. The device of claim 3 wherein said starter winding is a squirrel cage winding.

5. The device of claim 4, wherein the laminations are essentially circular in shape, and the squirrel cage winding is a full squirrel cage winding.

6. The device of claim 1, wherein each of said laminations is unitary and the laminations have a uniform direction of highest magnetic permeability.

7. The device of claim 6, wherein said plurality of laminations are substantially planar.

8. The device of claim 7, wherein said laminations have substantially circular outer perimeters, and said rotor further comprises a starter winding.

9. The device of claim 8, wherein said starter winding is a full squirrel cage winding.

10. The device of claim 1, wherein said rotor is a two-pole rotor.

11. The device of claim 10, wherein said plurality of laminations are substantially planar.

12. The device of claim 11 wherein said rotor further comprises a starter winding.

13. The device of claim 12 wherein said starter winding is a squirrel cage winding.

14. The device of claim 13, wherein the laminations are essentially circular in shape, and the squirrel cage winding is a full squirrel cage winding.

15. The device of claim 10, wherein each of said laminations is unitary and the laminations have a uniform direction of highest magnetic permeability.

16. The device of claim 15, wherein said plurality of laminations are substantially planar.

17. The device of claim 16, wherein said laminations have substantially circular outer perimeters, and said rotor further comprises a starter winding.

18. The device of claim 17, wherein said starter winding is a full squirrel cage winding.

19. The device of claim 1, wherein the laminations are radial laminations stacked axially on a shaft, and are essentially circular in shape and are comprised of a grain-oriented material having an inherent permeability ratio of at least 10 at an operating level of magnetic flux, the laminations each defining a plane in which the rotor has a uniform grain direction having mutually perpendicular longitudinal and a transverse directions, each of which is also perpendicular to an axis of rotation of the rotor.

* * * * *